O. C. Macklett.
Lathing Machine.
N° 79,366.   Patented Jan. 30, 1868.
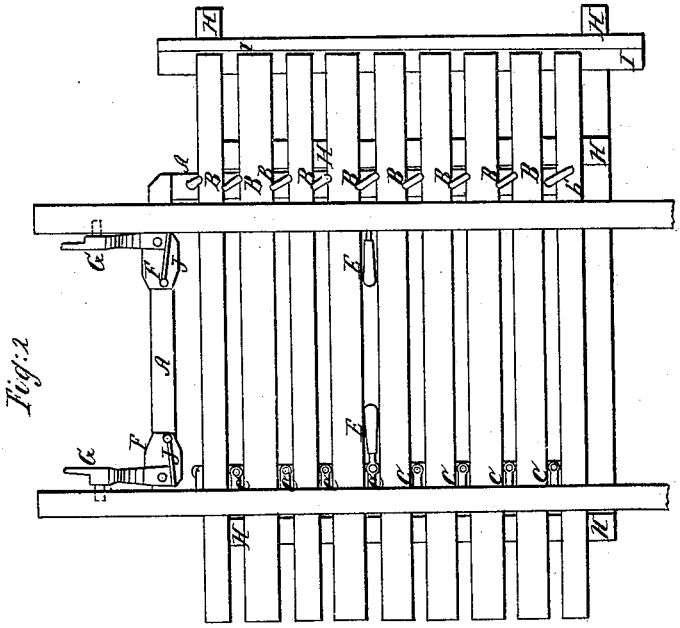
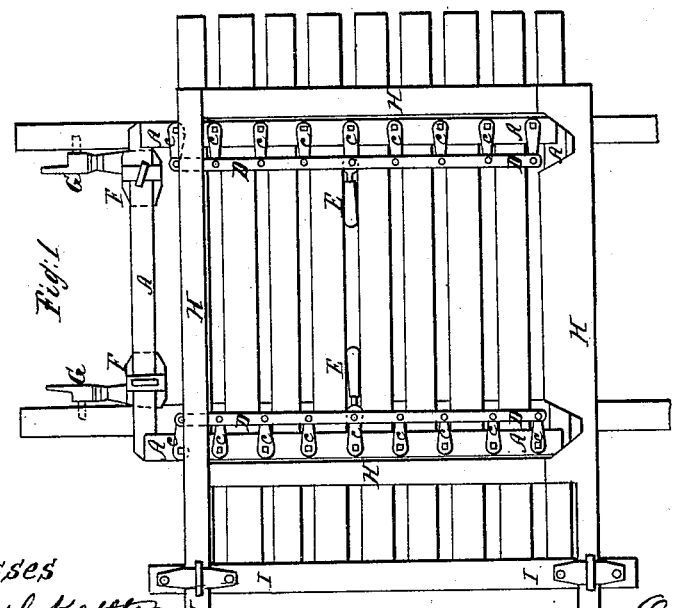

United States Patent Office.

O. C. MACKLETT, OF ST. PAUL, MINNESOTA.

Letters Patent No. 79,366, dated June 30, 1868.

IMPROVED LATHING-MACHINE.

*The Schedule referred to in these Letters Patent and making part of the same.*

TO ALL WHOM IT MAY CONCERN:

Be it known that I, O. C. MACKLETT, of St. Paul, in the county of Ramsey, and State of Minnesota, have invented a new and improved Lathing-Machine; and I do hereby declare that the following is a full, clear, and exact description thereof, which will enable others skilled in the art to make and use the same, reference being had to the accompanying drawings, forming part of this specification.

Figure 1 is a front view of my improved lathing-machine.

Figure 2 is a rear view of the same.

Similar letters of reference indicate corresponding parts.

My invention has for its object to furnish an improved machine, by the use of which laths may be attached to the scantlings and joists more rapidly and accurately than is possible when the lathing is done in the ordinary manner; and it consists in the construction and combination of the various parts, as hereinafter more fully described.

A is a frame, the side and end bars of which are rigidly secured to each other.

B are cross-head or hook-pins or bolts, which pass through the side bars of the frame A at suitable distances apart, and to the ends of which are rigidly attached the ends of the short levers C. The ends of the cross-heads or hooks of the pins or bolts B are made sharp, so that when the said cross-heads are turned into a vertical position, the said sharp ends or edges may be forced into the edges of the laths, and fasten them securely in place, and when the cross-heads are turned into a horizontal position, the laths may be readily slid into their places. The other ends of the short levers C are pivoted to the vertical bars D, so that all the said levers C upon one side of the frame A may be moved together. The end of one of the middle levers C, upon each side of the frame A, may be extended inward, and have handles, E, formed upon or attached to them, for convenience in moving the said bars up and down to operate the said levers; or, if desired, the handles E may be attached directly to the said bars D. The cross-head of the lower pin B, upon each side of the frame A, should be replaced by a hook, b', which hooks upon the lower lath, which should be secured in place before the frame A is applied, so as to hold the said frame securely in place while the laths are being inserted and secured.

F are slide blocks, which slide upon the upper bar of the frame A, so that they may be adjusted according to the distance apart of the scantling or joist, and which, when adjusted, are secured in place by set-screws, as shown in fig. 1.

To the rear sides of the sliding blocks F are pivoted dogs G, the hooks or points of which are driven into the sides of the joists or scantlings, to hold the upper part of the frame A in place while the laths are being put in and fastened.

J are springs, one end of which is attached to the sliding blocks F, and the other or free ends of which rest against the inclined lower ends of the dogs G, so as to hold the said dogs back when their points are not driven into the joists or scantlings.

H is a frame, fitting upon the frame A, and the top and bottom bars of which extend beyond the side bar upon one side.

I is a sliding gauge, sliding upon the projecting ends of the top and bottom bars of the frame H, and which is secured in place, when adjusted, by set-screws, as shown in fig. 1. The inner side of the vertical-sliding gauge I is provided with a flange, against which the ends of the laths strike when pushed into place, so as to keep the ends of the lath exactly in line with each other.

I claim as new, and desire to secure by Letters Patent—

1. The combination of the frame A, cross-head or hook-pins B, short levers C, and vertical bars D, with each other, substantially as herein shown and described, and for the purpose set forth.

2. The combination of the adjustable sliding blocks F and pivoted dogs G with each other, and with the top bar of the frame A, substantially as herein shown and described, and for the purpose set forth.

3. The combination of the frame H and adjustable sliding gauge I with the frame A, substantially as herein shown and described, and for the purpose set forth.

O. C. MACKLETT.

Witnesses:
G. BENSBERG,
A. R. KEEFE.